Figure 1:
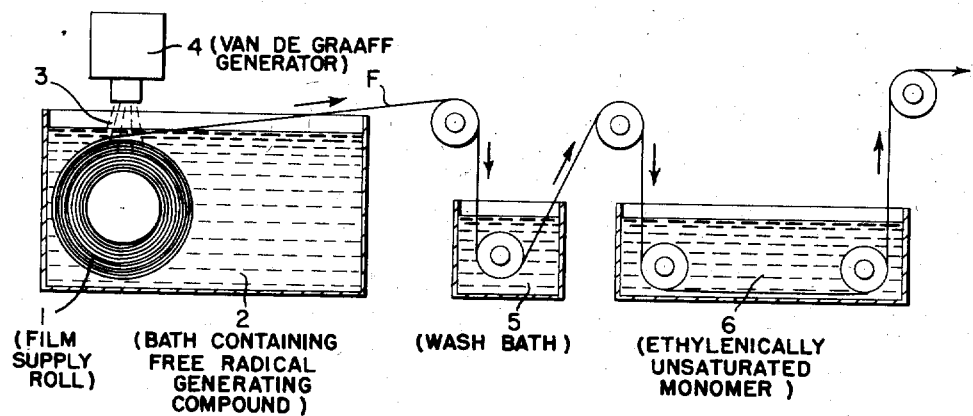

Oct. 6, 1959  N. G. GAYLORD  2,907,675
PROCESS OF COATING POLYMERIC SUBSTRATES

Filed July 8, 1955

INVENTOR
NORMAN GRANT GAYLORD

BY *A. Ralph Snyder*
ATTORNEY

2,907,675
Patented Oct. 6, 1959

United States Patent Office

2,907,675
PROCESS OF COATING POLYMERIC SUBSTRATES

Norman G. Gaylord, Westbury, N.Y., assignor to E. I. du Pont de Nemours and Company, Wilmington, Del., a corporation of Delaware Application July 8, 1955, Serial No. 520,648

11 Claims. (Cl. 117—47)

This invention relates to a process of adhering polymeric coatings to polymeric substrates, and more particularly, to a process of adhering polymeric coatings to thermoplastic polymeric films.

The general effects of high energy particle irradiation upon high molecular weight polymers are known. Since high polymers are covalent substances, the effect of radiation is largely caused by ionization and electronic excitation. These processes cause instantaneous flow of electric current and the breakage and rearrangement of chemical bonds, and the formation of free radicals. In the case of many high polymers, irradiation initiates chemical reactions which may include gas liberation, double-bond formation and elimination, degradation, polymerization, cross-linking and vulcanization, vitrification, hydrogenation, and others. Effecting one or more of such phenomena tends to bring about important changes in the physical properties of the high molecular weight polymeric material. The extent to which such changes in physical properties are useful depends upon the particular material being treated, the conditions of treatment, and the intended end use for the irradiated product.

A summary of the effects of high energy particle irradiation upon high molecular weight polymers appears in Modern Plastics, September 1954, 141–238, in an article titled "Effects of Atomic Radiation on High Polymers," by K. H. Sun. This article also includes an extensive bibliography of references pertinent to the subject.

It is also known that high energy particle irradiation may be employed to effect polymerization of monomeric materials which polymerize to form polymers by the recurring addition of the monomer units, i.e., the formula of the monomer is identical to that of the structural unit of the polymer (cf. British Patent 665,262 issued to A. A. Brasch). These monomers are those with ethylenic or diene unsaturation. Furthermore, it is known that high energy particle irradiation may be employed to effect condensation of various materials to form polymers wherein the molecular formula of the monomers differs from that of the structural unit. In many condensation processes chemical union of the polymer molecules takes place with the elimination of simpler molecules (e.g., $H_2O$, HCl, NaCl, $NH_3$ or the like). On the other hand, condensation polymers may be prepared from certain monomeric derivatives whereby the elimination of such simple molecules is not required. This is because the simple molecule has already in effect been eliminated from the monomer.

An object of the present invention is to provide a process of adhering a coating of a polymer formed from an ethylenically unsaturated compound upon the surface of a formed substrate of a high molecular weight polymeric material. A further object is to form high molecular weight polymeric films having an adherent coating of a chemically dissimilar polymer formed from an ethylenically unsaturated compound. Other objects will be apparent from the following description of the invention.

The above objects are accomplished in accordance with the present invention, which, briefly stated, comprises irradiating shaped, polymeric substrate, e.g., polymeric film, with high energy particle irradiation in a fluid atmosphere containing a compound capable of forming free radicals, and substantially immediately thereafter contacting the surface of said irradiated substrate with an ethylenically unsaturated monomer, to effect polymerization and bonding thereof to the substrate surface.

From a theoretical approach it is believed that the present process results in actual chemical bonding between the polymeric substrate and its polymeric coating which in the preferred embodiment of the invention differs chemically from the substrate. In view of the fact that irradiation of polymeric materials tends to effect the formation of free radicals, it is believed that free radicals are formed upon the surface of the irradiated polymeric substrate, and that these free radicals serve as polymerization initiators whereby polymeric chains are grown and expanded to form a high molecular weight polymeric coating which is chemically bonded to its substrate. Examples to be presented hereinafter contain substantial evidence that an actual chemical bonding between the coating and substrate is effected by the process of the present invention. Regardless of theories, however, it should be understood and emphasized that this process serves to effect a highly tenacious polymeric coating, particularly upon a substantially chemically dissimilar polymeric substrate, and the coating cannot be removed by chemical extraction techniques or by flexing the coated substrate in an attempt to flake off or physically strip the coating from its substrate.

As employed herein, the term "shaped polymeric substrate" refers to films, filaments, fabrics woven from formed filaments, sheets, rods, tubes, particles of any geometric configuration, etc. For purposes of illustration, however, the present process will be hereinafter described with specific reference to treatment of film as the preferred shape of substrate. The shaped substrate may be formed from a thermoplastic or thermosetting type polymeric compound which has been formed by addition polymerization or by condensation. Addition polymers are those formed by the recurring addition of a monomeric unit, and the formula of the monomer is identical with that of the unit structural formula of the polymer. Polymers formed by addition polymerization may usually be subjected to thermal or photochemical degradation to yield the monomer unit. Typical addition polymers or copolymers may be formed from the following monomers having ethylenic or diene unsaturation: alkyl acrylates and methacrylates such as methyl methacrylate, ethyl acrylate, etc., acrylic and methacrylic acid, ethylene and its derivatives such as the halosulfonated ethylenes and tetrafluoroethylene, vinyl chloride, vinyl acetate, vinylidene chloride, styrene, acrylonitrile and methacrylonitrile, butadiene, etc. Polymers and copolymers formed from the aforementioned monomeric materials may be substantially thermoplastic or they may be thermosetting as a result of their having been cross-linked or vulcanized. For example, the polymer may be a rubbery vulcanized material formed from butadiene, butadiene and styrene, chloroprene, butadiene/acrylonitrile, etc. It is preferred that the chemical composition of the substrate differ from that of the coating formed thereon.

The shaped polymeric substrate may also be formed from condensation polymers, which polymers usually have a unit molecular structural formula differing from the molecular formula of the monomer. During chemical union of monomer molecules in condensation reactions simpler molecules are eliminated, such as $H_2O$, HCl, NaCl, $NH_3$ and the like. Normally, the monomer can be obtained from condensation polymers by hydrolysis. It should also be apparent that some condensation polymers may be prepared from certain monomeric derivatives whereby the elimination of simple molecules is not required because the simple molecules has already in effect been eliminated from the monomer. Examples of such monomeric compounds are acid anhydrides, lactones and lactams. More specifically, a polyamide can be prepared from an amino carboxylic acid with the evolution of water molecules. On the other hand, the identical polymer can be prepared from the epsilon lactam derivative of that amino carboxylic acid, but in this case no water need be eliminated. Similarly, alkyd resins can be prepared by reacting glycerine and phthalic acid with the elimination of water molecules, or by reacting glycerine with phthalic anhydride with the elimination of a smaller amount of water. Examples of organic condensation polymers which may be formed into shaped substrates for treatment in accordance with the present invention include the polyesters and polyamides (U.S. Patents 2,071,250, -251 and -253), and more particularly, polyesters such as polyethylene terephthalate (U.S. Patent 2,130,948 and 2,241,322). Other condensation polymers, including both thermoplastic and thermosetting polymers include polyaminotriazoles, polyethers, polyureas, polyurethanes, phenolalkyds, urea-aldehydes, melamine resins, silicones, etc.

High energy particle irradiation, which is employed in carrying out the present invention may be from positive ions, for example, protons, deuterons or alpha particles, from neutrons or from electrons. The charged particles may be accelerated to high speed by means of a suitable voltage gradient using such devices as a resonant cavity accelerator, a Van de Graaff generator, a betatron, a synchrotron, a cyclotron or the like. Neutron irradiation may be produced by bombardment of selected light metal, e.g., beryllium, targets with high energy positive particles. In addition, particle radiation suitable for use in the present process may be obtained from an atomic pile, or from radioactive isotopes. In carrying out the present process, it is important to control the amount of radiation to which any web material is exposed. The preferred dose for any particular web material depends essentially upon the chemical structure of the material and the intended end use for the irradiated product. In this description of the invention irradiation dosage may best be described in terms of REPS (roentgen equivalent physical) where a REP is defined as that amount of high energy particle radiation (cathode rays, neutrons, or positive ions) which results in an energy absorption of 83.8 ergs per gram of water or equivalent absorbing medium.

As stated hereinbefore, it is believed that the irradiation step of the present process brings about the formation of free radicals upon the surface of the polymeric substrate, and it is believed that the number formed upon the substrate surface and the rate at which such free radicals are formed depend to a certain degree upon the density and chemical nature of the fluid medium surrounding the polymeric substrate during the irradiation treatment. When a relatively high density medium surrounds the film being irradiated, a greater number of obstacles are in the path of the beam of high energy particle radiation. Collisions between irradiation particles and the atomic and molecular structures contained in the polymeric substrate and its surrounding medium are believed to accelerate and facilitate formation of free radicals upon the surface of the irradiated substrate. On the other hand, it is quite often preferred to irradiate the polymeric substrate in a fluid medium containing a chemical compound capable of dissociating into free radicals, which in turn serve to react with elemental components at the surface of the polymeric substrate, and thereby form free radicals upon the surface of the substrate. The preferred fluid medium in which the polymeric substrate is irradiated is an inert liquid such as water or an organic solvent which is substantially inert toward the polymeric substrate. These liquids may then contain a chemical compound capable of dissociating into free radicals. The following table (Table I) gives the chemical formula of free radical generating compounds and shows the types of free radicals which are formed therefrom under proper conditions of temperature, pressure, irradiation, etc.:

TABLE I

| Compound | Free Radicals Formed |
|---|---|
| Hydrogen Peroxide | $H_2O_2 \longrightarrow HO \cdot + HO \cdot$ |
| Benzoyl Peroxide | $\underset{O}{C_6H_5\overset{\parallel}{C}}-O-O\underset{O}{\overset{\parallel}{C}C_6H_5} \rightleftarrows C_6H_5COO \cdot \longrightarrow C_6H_5 \cdot + CO_2$ |
| N-nitrosoacylanilides | $\underset{NO}{C_6H_5N}-CO-R \longrightarrow C_6H_5 \cdot + N_2 + R-\overset{O}{\underset{\downarrow}{\overset{\parallel}{C}}}-O \cdot$ <br> $R \cdot + CO_2$ |
| P-bromobenzenediazo hydroxide | $BrC_6H_4-N=N-OH \longrightarrow BrC_6H_4 \cdot + N_2 + HO \cdot$ |
| Triphenylmethylazobenzene | $(C_6H_5)_3C-N=N-C_6H_5 \longrightarrow (C_6H_5)_3C \cdot + N_2 + C_6H_5 \cdot$ |
| Azo-bis-isobutyronitrile | $(CH_3)_2\overset{CN}{\underset{\shortmid}{C}}-N=N-\overset{CN}{\underset{\shortmid}{C}}(CH_3)_2 \longrightarrow (CH_3)_2\overset{CN}{\underset{\downarrow}{\underset{\shortmid}{C}}}-N=N \cdot + \cdot \overset{CN}{\underset{\shortmid}{C}}(CH_3)_2$ <br> $\overset{CN}{(CH_3)_2C \cdot} + N_2$ |
| Tetraphenylsuccinonitrile (in dilute solution at 100° C.) | $(C_6H_5)_2\overset{CN}{\underset{\shortmid}{C}}-\overset{CN}{\underset{\shortmid}{C}}-(C_6H_5)_2 \rightleftarrows 2(C_6H_5)_2\underset{CN}{\overset{}{C}} \cdot$ |

With respect to the fluid medium or atmosphere in which the polymeric substrate is irradiated, it should be borne in mind that the fluid medium or atmosphere should not oxidize the substrate. This does not, however, preclude the use of so-called oxidizing agents or compounds which dissociate into free radicals under the influence of irradiation. Various compounds which are considered to be oxidizing agents in some reactions may be employed as the supplier of free radicals so long as the compound does not function to add oxygen to any oxidizable site on the surface of the polymeric substrate. For example, hydrogen peroxide, normally considered an oxidizing agent, appears to influence the formation of free radical sites upon the surface of the substrate, probably by the removal of hydrogen atoms from the substrate. In using agents which are normally considered to be oxidizing agents but which do not so function under the conditions of this process, e.g., hydrogen peroxide, it is preferred to subject the substrate immediately after irradiation to the action of wash water to remove any excess agent.

One of the salient features of the present invention is that extremely thin continuous or discontinuous polymeric coatings may be applied to a chemically dissimilar polymeric substrate. The thickness of any continuous or discontinuous coating may be regulated by controlling the amount of initial irradiation, the time the polymeric substrate is in contact with the polymerizable monomer, the density and chemical composition of the medium in which the polymeric substrate is irradiated, and the temperature at which polymerization is carried out. For example, it may be desirable to apply a polymeric size to a film, the size serving to improve film-to-film slip, prevent blocking or matting, increase the surface electrical properties of the film, and decrease the static accumulation on the film surface. Such coatings may be applied in non-continuous manner by masking the irradiation from certain areas of the film so that a very thin, discontinuous, but uniformly distributed, coating is adhered to the polymeric film substrate. Furthermore, discontinuous coatings may be applied by carrying out irradiation of a film surface under normal conditions, and thereafter immersing the irradiated film into a liquid polymerizable monomer for only a short duration. This may be followed by immersing the film in a solvent to wash and/or extract incompletely polymerized polymer and/or monomer from the film surface to give a thin, discontinuous coating which acts as a sizing.

Thicker coatings may be applied in accordance with the present invention by adding a further step of taking a substrate coated in accordance with the primary step described hereinbefore, and thereafter immersing this coated substrate in a polymerizable liquid from which the polymeric coating was formed and irradiating the coated substrate while it is immersed in a polymerizable monomer to effect polymerization and bonding of additional polymeric coating to the layer of coating already bonded. Since the coating is chemically identical to the polymer which will be formed from the monomer in which the film is being irradiated, bonding of additional polymer to the coating is facilitated; and a polymeric substrate having a substantially thicker coating is formed.

Any convenient technique of irradiating the surface of a polymeric substrate in a fluid atmosphere and thereafter contacting the irradiated surface with the ethylenically unsaturated monomer may be employed. In the accompanying drawing Fig. 1 illustrates diagrammatically a preferred arrangement for treating continuous film in accordance with the process of this invention, and Fig. 2 illustrates diagrammatically an alternative arrangement for treating continuous film.

Referring to Fig. 1, a supply roll 1 of continuous film F is immersed in a liquid bath 2 containing the free radical generating compound. The immersed film is subjected to bombardment by a stream 3 of high energy particles emitted from a suitable generator 4. Preferably the stream 3 is directed on the film in a transverse line coincident with the line at which the film leaves the roll 1. In this way, the high energy particle irradiation will penetrate into more than one layer of the film, and the irradiated layers of film are uniformly contacted by the bath 2 as fresh layers of the film in the roll are exposed. The irradiated film is passed through a bath 5 of wash water and thence through a bath 6 of ethylenically unsaturated monomer. After a suitable reaction period, the film is collected in a wind-up roll (not shown).

Figure 2:
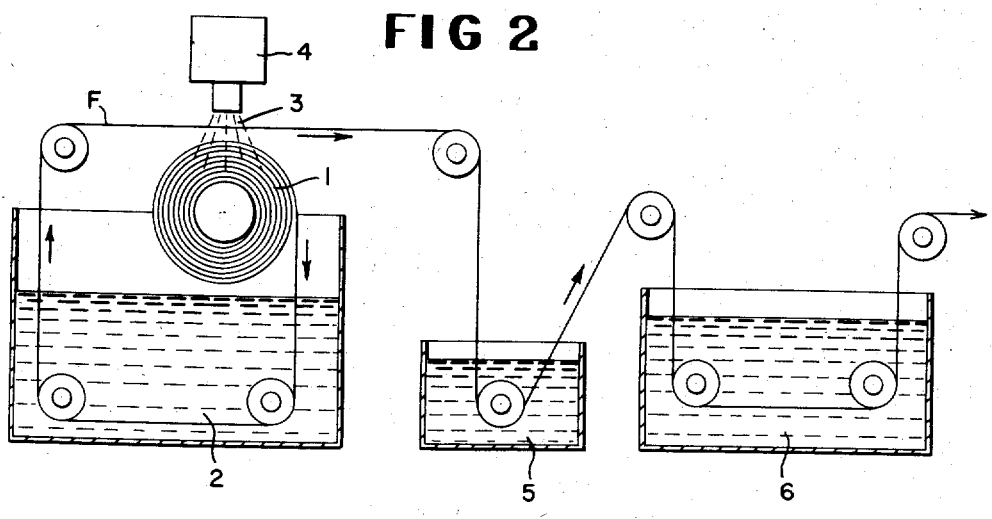

In the arrangement shown in Fig. 2, the roll 1 is located outside the bath 2 and the film being continuously unwound therefrom is passed into bath 2 and is then conducted over the top of roll 1 and under the beam of high energy particles so that the high energy particle irradiation passes through the film which has been immersed in bath 2 and the irradiation further penetrates the supply roll itself.

The following examples will serve to further illustrate the principles and practice of the present invention:

In the examples summarized in Table II all of the polymeric substrates (films having a thickness on the average of 1–2 mils) were irradiated under the beam of a Van de Graaff generator while immersed in an aqueous solution of 5% hydrogen peroxide containing a small amount of sodium oleate as a wetting agent. The film and solution of hydrogen peroxide were subjected to a particle irradiation dosage of 3,000,000 REP. Thereafter, the film was quickly removed, washed with water, and immediately immersed into a liquid polymerizable monomer (at substantially room temperature), and the film was left in the bath for a period of ½ to 1 minute. After immersion in liquid monomer the film is removed and dried for 30–90 minutes at a temperature of about 25° C. The resulting coated films were subjected to a number of preliminary tests designed to detect differences in the surface characteristics of these films as compared with the film substrate itself. Such differences or improvements in surface physical properties are recorded under the heading "Remarks" in Table II.

Certain coatings applied in accordance with the present invention improve the "printability" of the film. Printability was determined by applying Bensing Brothers & Deeney "Accelobrite" white ink (W-500) onto the film surface with a commercial ink spreader which comprised a steel rod having fine wire wrapped around the rod. The spreader produced a multiplicity of fine lines. The ink was dried for about 3 minutes at 30° C. and thereafter permitted to cool at room temperature. Adhesion between the printing ink and the film surface was then tested by applying a strip of pressure-sensitive tape upon the printed film surface and pressing the tape firmly into contact with the film surface. The tape was then stripped off rapidly from the film, and if no ink were removed, the printability was classed as 10. A rating of 5 indicated no improvement in printability over the film substrate, and values between 5 and 10 indicated various degrees of improvement in film printability.

Film slip, i.e., the ease with which a film surface slips past the surface of an adjacent film as pressure is applied to press the films together, is another property which may be improved by applying polymeric coatings to film substrates in accordance with the present invention. In measuring the film-to-film slip of the films produced in the foregoing examples, a weight of 500 grams was applied to press two films together, and the force in grams required to start the films sliding against each other was observed.

TABLE II

| Example | Film Substrate | Coating | Remarks |
| --- | --- | --- | --- |
| 1 | Polyethylene | Polystyrene | |
| 2 | do | Polyvinylidene Chloride. | Improved film-to-film slip. |
| 3 | do | Polymethyl Methacrylate. | Do. |
| 4 | Polyethylene (high density—at least 0.955). | Polystyrene | Increased electrical surface resistance. |
| 5 | Polyethylene Terephthalate. | do | Improved film-to-film slip. |
| 6 | do | Polyvinylidene Chloride. | Do. |
| 7 | do | Polymethyl Methacrylate. | Do. |
| 8 | Polyhexamethylene Sebacamide. | Polystyrene | |
| 9 | do | Polyvinylidene Chloride. | |
| 10 | do | Polymethyl Methacrylate. | Improved printability (rating 8). |
| 11 | Polyvinyl Fluoride | Polystyrene | Improved printability (rating 7–9). |
| 12 | do | Polyvinylidene Chloride. | Do. |
| 13 | do | Polymethyl Methacrylate. | Improved printability (rating 6–8). |

Coated film formed in Example 3 was subjected to an infrared analysis. The infrared spectrum for the film showed all of the characteristic absorption bands obtained with polymethyl methacrylate. A sample of the film was then soaked in chloroform at 30° C. for 3 hours (with stirring). At the end of this period the film was washed in fresh chloroform and dried under vacuum overnight at 90° C. Re-examination of the infrared spectrum for the film still showed the characteristic absorption bands for polymethyl methacrylate. As a control experiment, a small block of polymethyl methacrylate, irradiated at a dosage of 1 MREP (mega-REP) was immersed in chloroform at 30° C. Under these conditions the polymethyl methacrylate readily dissolved in the chloroform. The results of this evaluation strongly indicate that a highly tenacious and different type bond is obtained between the polymethyl methacrylate coating and the polyethylene film substrate.

The film formed in Example 1 was also subjected to infrared analysis. The infrared spectrum for the film showed all of the characteristic absorption bands obtained with polystyrene. A sample of the film was then soaked in toluene for 3 hours at 30° C. (with stirring). At the end of this period, the film was washed in fresh toluene and dried under vacuum overnight at 90° C. Re-examination of the infrared spectrum for the film still showed the characteristic absorption bands for polystyrene. As a control experiment, a small sample of polystyrene film, irradiated under a dosage of 2 MREP was immersed in toluene at 30° C. Under these conditions, the polystyrene readily dissolved in the toluene. The results of this evaluation strongly indicate that a highly tenacious and different type bond is obtained between the polystyrene coating and the polyethylene film substrate.

*Example 14*

To obtain a thicker coating of polymethyl methacrylate upon the polyethylene film substrate, the film formed in accordance with Example 3 was immersed in liquid methyl methacrylate monomer and the film-in-monomer was irradiated at a dosage of 2 MREP. As a result of this treatment, additional methyl methacrylate was polymerized and bonded to the polymethyl methacrylate coating already adhered to the polyethylene film substrate. The resulting polyethylene substrate had a thicker polymethyl methacrylate coating than that applied in Example 3.

*Example 15*

The procedure described in Example 14 was repeated except that the coated film formed in Example 1 was immersed in liquid styrene, and the film-in-styrene monomer was irradiated at a dosage of 2 MREP. The resulting polyethylene substrate had a thicker polystyrene coating than that applied in the initial steps described in Example 1.

I claim:

1. A process which comprises irradiating shaped polymeric substrate with high energy particle irradiation in a fluid atmosphere which does not oxidize the substrate and which contains a compound capable of forming free radicals, and substantially immediately thereafter contacting the surface of the irradiated substrate with an ethylenically unsaturated monomer whereby to form on said substrate a polymeric coating.

2. A process according to claim 1 wherein said monomer yields a polymeric coating chemically dissimilar to the substrate.

3. A process which comprises irradiating polymeric film with high energy particle irradiation in a fluid atmosphere which does not oxidize the substrate and which contains a compound capable of forming free radicals, and substantially immediately thereafter contacting the surface of the irradiated film with an ethylenically unsaturated monomer whereby to form on said film surface a polymeric coating.

4. A process according to claim 3 wherein said monomer yield a polymeric coating chemically dissimilar to the substrate.

5. A process according to claim 4 wherein the film is a thermoplastic polymeric film.

6. A process which comprises irradiating polymeric film with high energy particle irradiation in a fluid atmosphere containing hydrogen peroxide and substantially immediately thereafter contacting the surface of the irradiated film with an ethylenically unsaturated monomer whereby to form on said film surface a polymeric coating.

7. A process according to claim 6 wherein said monomer yields a polymeric coating chemically dissimilar to the substrate.

8. A process which comprises irradiating polymeric film with high energy particle irradiation in an atmosphere of aqueous hydrogen peroxide, and substantially immediately thereafter contacting the surface of the irradiated film with an ethylenically unsaturated monomer whereby to form on said film surface a polymeric coating.

9. A process according to claim 8 wherein said monomer yields a polymeric coating chemically dissimilar to the substrate.

10. A process which comprises irradiating polymeric film with high energy particle irradiation in an atmosphere of aqueous hydrogen peroxide, washing said irradiated film to remove excess hydrogen peroxide, and immediately thereafter contacting the surface of the irradiated film with an ethylenically unsaturated monomer whereby to form on said film surface a polymeric coating.

11. A process according to claim 10 wherein said monomer yields a polymeric coating chemically dissimilar to the substrate.

References Cited in the file of this patent

UNITED STATES PATENTS 2,715,075    Wolinski _____ Aug. 9, 1955

FOREIGN PATENTS 665,262    Great Britain _____ Jan. 23, 1952
511,718    Belgium _____ Nov. 28, 1952

OTHER REFERENCES

"Modern Plastics," volume 32, No. 10, June 1955, pages 159, 252 and 254.